United States Patent [19]
Puzik

[11] 3,769,691
[45] Nov. 6, 1973

[54] METHOD OF MAKING TUBULAR LAMINATED ARTICLE
[75] Inventor: Otto V. Puzik, Willoughby, 44094
[73] Assignee: Willow Hill Industries, Inc., Willoughby, Ohio
[22] Filed: Apr. 8, 1971
[21] Appl. No.: 132,425

[52] U.S. Cl............................ 29/523, 16/2, 59/8, 138/140, 29/149.5, 148/11.5, 148/14, 305/58
[51] Int. Cl...................... B21d 39/00, B23p 11/02
[58] Field of Search.................. 29/523, 149.5, 421, 29/446; 148/14, 36, 11.5; 16/2; 138/140; 305/58; 59/8

[56] References Cited
UNITED STATES PATENTS

| 726,520 | 4/1903 | Emery | 29/421 UX |
|---|---|---|---|
| 1,512,190 | 10/1924 | Barnes | 29/149.5 R X |
| 2,061,223 | 11/1936 | Cunningham et al. | 305/58 X |
| 2,216,833 | 10/1940 | Barry | 29/523 |
| 2,337,247 | 12/1943 | Kepler | 138/140 UX |
| 2,675,625 | 4/1954 | Rayl | 16/2 UX |
| 3,220,602 | 11/1965 | Ficker | 29/523 X |
| 3,227,586 | 1/1966 | Spencer | 305/58 UX |

FOREIGN PATENTS OR APPLICATIONS

| 526,593 | 9/1940 | Great Britain | 138/140 |

Primary Examiner—Charlie T. Moon
Attorney—Yount & Tarolli

[57] ABSTRACT

A tubular laminated article constructed in accordance with the present invention can be adopted to function in many different ways in different assemblies. Included among these assemblies is a crawler track assembly having a laminated bushing with a relatively hard, wear resistant inner layer and a relatively ductile outer layer which is capable of withstanding impact or shock loads. The tubular laminated article can advantageously be used as a pressure tube in an impact absorber assembly which absorbs impact forces when a vehicle encounters an accident. The laminated bushing and pressure tube are both made by plastically expanding tubular metal blanks, one or more at a time, in a die cavity at a temperature below the crystallization temperature of the metal. Expanding the blanks moves surfaces of the blanks into tight abutting engagement to form a tubular laminated article having firmly joined layers with accurately dimensioned inner and outer surfaces. One layer of the tubular laminated article may be formed of a metal having a relatively high hardenability. Another layer of the article may be formed of a metal having a relatively low hardenability. Therefore, a subsequent heat treating results in the formation of a hard layer disposed adjacent to a ductile layer. Of course, the number and arrangement of hard and ductile layers could be varied.

3 Claims, 9 Drawing Figures

INVENTOR
OTTO V. PUZIK

BY Yount and Tarolli
ATTORNEYS

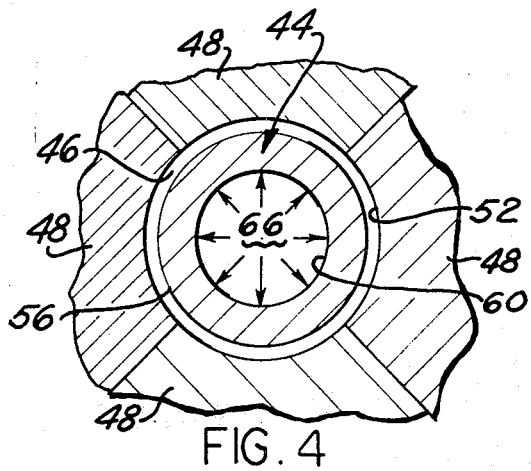
FIG. 4
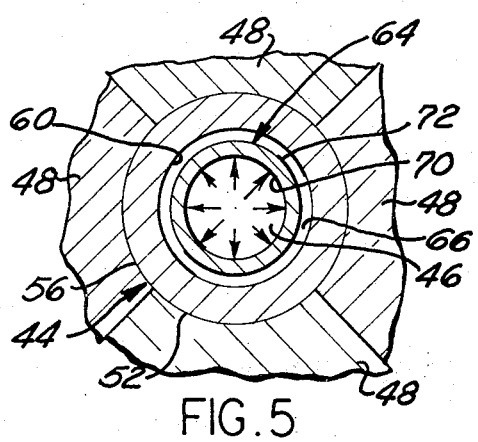
FIG. 5
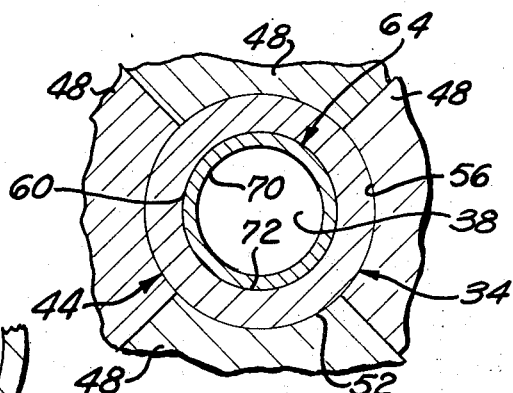
FIG. 6
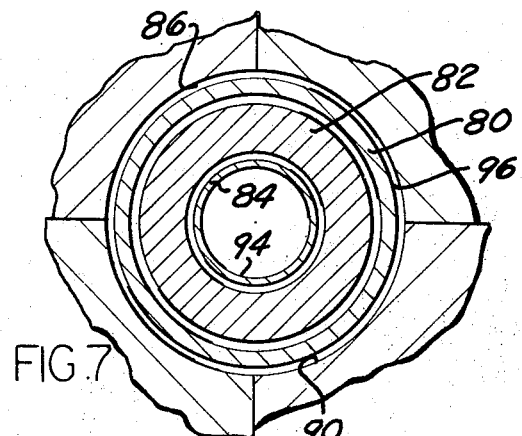
FIG. 7
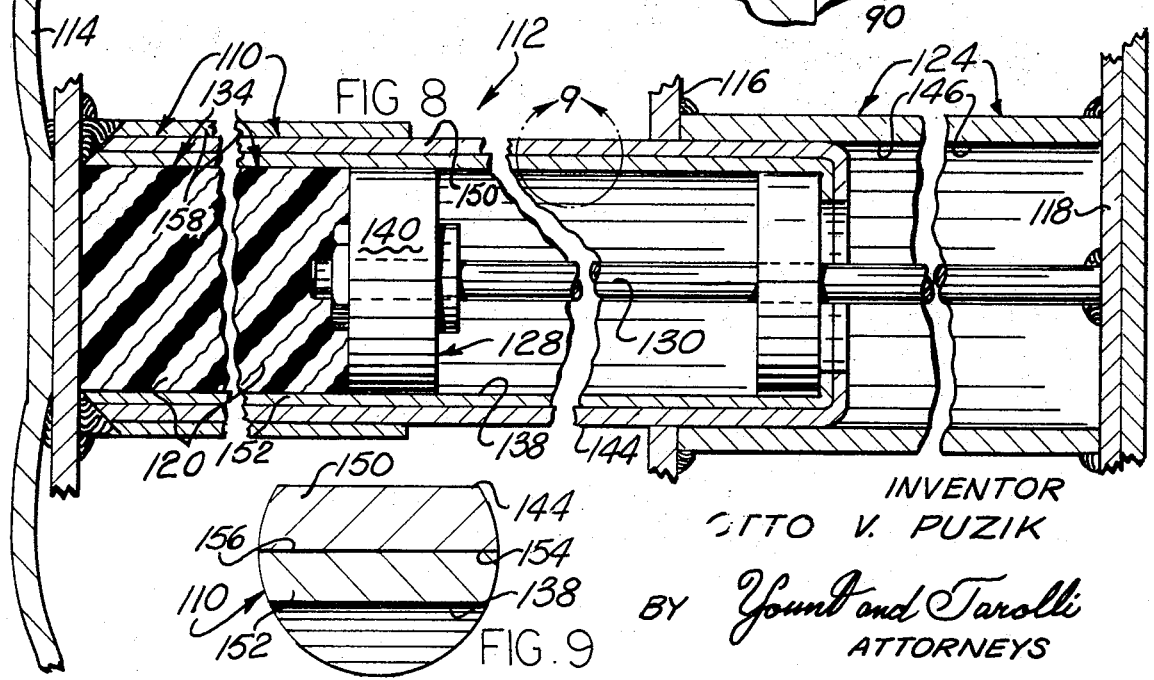
FIG. 8
FIG. 9
INVENTOR
OTTO V. PUZIK
BY Yount and Tarolli
ATTORNEYS

METHOD OF MAKING TUBULAR LAMINATED ARTICLE

The present invention relates to an improved laminated article and a method of making the laminated article.

Tubular articles, such as bushings and pressure tubes, have been made in many different ways, including the machining of seamless tubing and the boring of bar stock. However, these methods have been somewhat unsatisfactory in that making a tubular article which is capable of withstanding severe operating conditions and has accurately formed inner and outer surfaces has been relatively difficult and costly. The cost of making a tubular article is particularly high when the article is relatively long and is formed by machining inside and outside surfaces of a tube to accurate dimensions.

When a tubular article is used as a bushing in a crawler track assembly, it is subjected to wear by relative movement between the bushing and a pin which hingedly interconnects a pair of adjacent track shoes. During operation of the crawler track assembly, the outer surface of the bushing is subjected to impact or shock loads by many operating conditions, including engagement with a drive sprocket. To enable the crawler track bushing to resist both internal wear and external loading, the bushing should have a relatively hard inner layer which is wear resistant and a relatively ductile outer layer which is capable of withstanding shock or impact loads. Of course, bushings used in many other environments must also be capable of withstanding both wear and shock or impact loading.

When a tubular article is used as a pressure tube in an impact absorber on a vehicle, it is subjected to very large internal pressure forces by material which is pressurized within the tube to absorb impact forces. In addition, when the impact absorber is associated with the bumper of a vehicle, the pressure tube may often be sucjected to bending forces due to sidewise loading of the bumper. To enable the pressure tube to withstand both the internal pressure and sidewise bending forces, the pressure tube may be formed of a relatively hard metal which is difficult to machine to accurate internal and external dimensions. Of course, tubular articles constructed in accordance with the present invention can be used for purposes other than pressure tubes or bushings.

Accordingly, it is an object of this invention to provide a relatively inexpensive method of making a tubular article which is capable of withstanding severe operating conditions, such as the operating conditions to which bushings in crawler track assemblies and pressure tubes in impact absorbers are subjected.

Another object of this invention is to provide a new and improved method of making a tubular laminated article having layers of different hardnesses.

Another object of this invention is to provide a new and improved crawler track assembly which includes a laminated bushing having an inner layer of a relatively hard metal which tends to minimize wear induced by relative rotation between the bushing and an associated pin and an outer layer of relatively ductile metal which enhances the ability of the bushing to withstand shock or impact loads.

Another object of this invention is to provide a new and improved method of making a tubular laminated article having a plurality of layers, at least some of which have different hardnesses, and wherein the method includes the steps of providing a plurality of tubular metal blanks at least some of which have different hardenability characteristics, plastically expanding the tubular metal blanks at a temperature below the crystallization temperature of the metal to press surfaces of the blanks into tight abutting engagement with each other to thereby firmly join te layers of the laminated article, and increasing the hardness of at least one of the layers of the laminated article by hardening this layer after the tubular metal blanks have been expanded.

Another object of this invention is to provide a new and improved method of making a tubular laminated article having an axially extending exterior surface of a predetermined cross-sectional size and an axially extending interior surface of a smaller predetermined cross-sectional size, wherein the method includes the step of plastically expanding a plurality of tubular metal blanks, one or more at a time, in a work cavity and at a temperature below the crystallization temperature of the metal.

Another object of this invention is to provide a new and improved impact absorber for use in a vehicle to at least partially absorb impact forces resulting from an accident, and wherein the impact absorber includes a laminated pressure tube which forms a chamber for holding a material to be pressurized and which is capable of withstanding relatively large pressure forces.

These and other objects and features of the invention will become more apparent upon a consideration of the following description taken in connection with the accompanying drawings wherein:

FIG. 4 is a schematic illustration depicting the positioning in a die cavity of a tubular blank which is then expanded to form an outer layer of the laminated bushing of FIG. 3;

FIG. 5 is a schematic illustration depicting the positioning in the die cavity of a second tubular blank which is then expanded to form an inner layer of the laminated bushing of FIG. 3;

FIG. 6 is a schematic illustration depicting the relationship between the tubular blanks after they have been expanded in the die cavity to form the laminated bushing of FIG. 3;

FIG. 7 is a schematic illustration depicting the positioning of three tubular blanks in a die cavity in which they are expanded at the same time to form a three layer laminated bushing;

FIG. 8 is a sectionalized schematic illustration of an impact absorber having a laminated pressure tube constructed in accordance with the present invention in the manner illustrated in FIGS. 4, 5, and 6; and FIG. 9 is an enlarged fragmentary sectional view, taken along the line 9—9 in FIG. 8, further illustrating the construction of the laminated pressure tube.

A tubular article formed by the method of the present invention has a laminated construction. This laminated construction is obtained by expanding tubular metal blanks, one or more at a time, in a die cavity. As the inner tubular blanks are plastically expanded into tight abutting engagement with the outer blanks, a relatively strong tubular laminated article is formed. The laminations provide this article with strength characteristics which exceed those of a similar article which does not have a laminated construction. Although tubular laminated articles constructed in accordance with the present invention can be used in many different environments, the tubular articles are described herein in association with a crawler track assembly and an impact absorber assembly.

Figure 1:
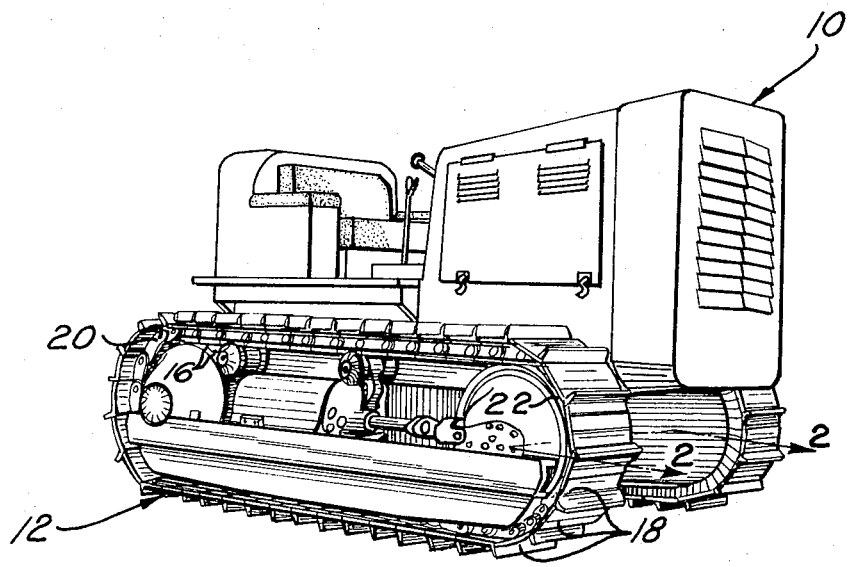
FIG. 1 is an illustration of a crawler type vehicle having a track assembly constructed in accordance with the present invention.

A known crawler type tractor 10 having a track assembly 12 constructed in accordance with the present invention is illustrated in FIG. 1. The tractor 10 has a drive or bull sprocket 16 which is rotated to drive the track assembly 12 in a known manner. When the drive sprocket 16 is rotated in a clockwise direction (as viewed in FIG. 1), the track assembly 12 is also driven in a clockwise direction (as viewed in FIG. 1) to move the tractor 10 forwardly. Similarly, rotation of the drive sprocket 16 and track assembly 12 in a counterclockwise direction results in the tractor 10 being driven backwards.

Figure 2:
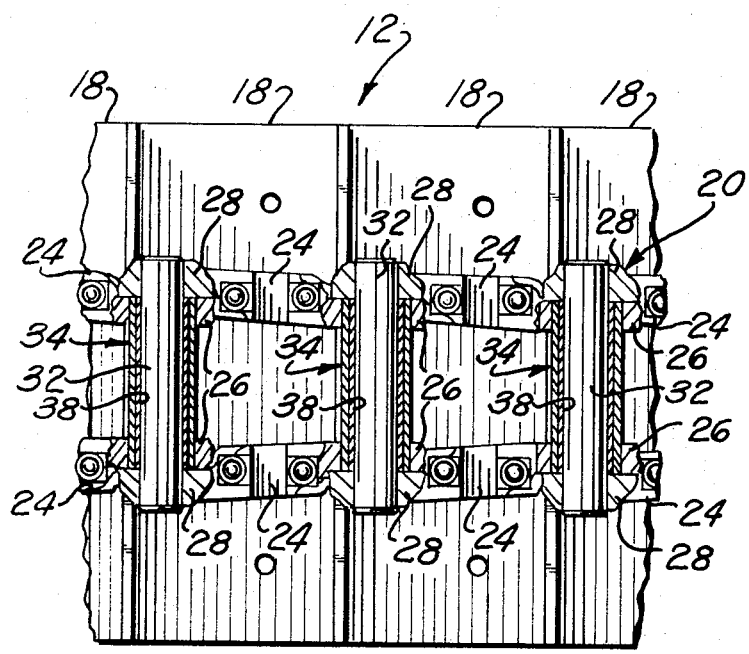
FIG. 2 is a fragmentary sectional view, taken generally along the line 2—2 of FIG. 1, illustrating the construction of the track assembly.

The track assembly 12 includes a plurality of track shoes or treads 18 wxich are hingedly interconnected in a known manner by a roller chain 20 (see FIG. 2). The roller chain 20 hingedly interconnects the track shoes 18 so that they can pivot or rotate relative to each other as the shoes 18 move around the drive sprocket 16 and an idler sprocket 22 of the tractor 10. The roller chain 20 includes a plurality of links 24 which are bolted to the track shoes 18 with their leading end portions 26 disposed in an overlapping relationship with trailing end portions 28 of the next adjacent links. Although the links 24, in the illustrated embodiment of the invention, are formed separately from the track shoes 18 and bolted to the track shoes, it should be understood that the links 24 could be integrally formed with the track shoes 18. In face, the links 24 could consist of support posts or sections projecting from the track shoes 18 with interconnecting portions of the links being formed by the track shoes.

Figure 3:
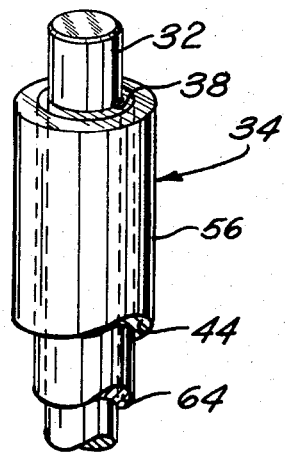
FIG. 3 is a partially broken away view illustrating the relationship between a laminated bushing constructed in accordance with the present invention and a pin of the track assembly of FIG. 2.

The links 24 are pivotally interconnected by pins 32 and bushings 34 (see FIGS. 2 and 3). Each of the pins 32 has an interference fit with trailing end portions 28 (FIG. 2) of a pair of links 24 which are connected to the same track shoe 18. The interference fit between the pin 32 and associated links 24 holds the pin against rotation relative to these links. Each of the bushings 34 has an interference fit with the leading end portions 26 of a pair of links 24 which are associated with the same track shoe 18. The interference fit between the bushings 34 and end portions 26 of the links 24 holds the bushings against rotation relative to these links.

Each of the bushings 34 has a central opening or passage 38 which is accurately dimensioned so that the pins 32 and bushings 34 can turn easily relatively to each other. Thus, when the track shoes 18 pass around the drive sprocket 16 and idler sprocket 22, the associated pins 32 and bushings 34 rotate relative to each other to provide the necessary hinge action between adjacent track shoes.

The bushings 34 must be accurately formed so that the outer surfaces of the bushings will have the desired interference fit with the leading end portions 26 of the associated links 24 and so that the inner surfaces of the bushings will slide or turn easily relatively to the associated pins. If the external dimensions of the bushings 34 are oversize, it will be difficult or impossible to press the bushings into openings formed in the leading end portions 26 of the associated links 24. Of course, if the exterior dimensions of the bushings 34 are undersize, the bushings 34 will fit loosely in the openings provided in the leading end portions 26 of the associated links 24. Similarly, if the passages 38 through the center of the bushings 34 are too large, the bushings will have a sloppy fit with the associated pins 32. On the other hand if the passages 38 are too small, it will be impossible to insert the associated pins 32 through the passages without interference and binding between the pins and the bushings 34.

The present invention provides a method of making a bushing having accurately dimensioned internal and external surfaces. This is accomplished by plastically expanding tubular metal blanks at a temperature below the crystallization temperature of the metal, i.e. by cold working the metal. The blanks are expanded, one or more at a time, in a die or work cavity having an internal surface of a size and shape corresponding to the desired size and shape of the external surface of the bushing. The innermost tubular blank is expanded so that it has a central opening or passage of a size and shape corresponding to the desired size and shape of the passage through the center of the bushing.

To form a bushing or other tubular laminated article in accordance with the present invention, a tubular blank 44 (FIG. 4) is inserted into a die or work cavity 46 formed by a plurality of die sections or members 48. The die or work cavity 46 has a cylindrical axially extending wall 52 which is accurately formed to have an internal diameter which is the same as the desired external diameter of the bushing 34. The tubular blank 44 has a cylindrical axially extending outer surface 56 having a diameter which is smaller than the diameter of the internal surface 52 of the work cavity 46. Therefore, the tubular blank 44 can be readily positioned in the work cavity 46.

The tubular blank 44 is plastically expanded by applying radially outwardly directed pressure against a cylindrical inner surface 60 of the blank 44, in the manner depicted schematically by arrows in FIG. 4. This expanding of the blank 44 occurs at a temperature below the crystallization temperature of the metal of the blank and is continued for a sufficient length of time to press the outer surface 56 of the blank against the inner surface 52 of the die cavity 46. The pressure applied to the inner surface 60 of the blank 44 is of a magnitude such as to force the outer surface 56 against the die surface 52 and cold work the blank to the desired dimensions for the outer surface of the bushing 34.

Since the blank 44 is cold worked as it is expanded and pressed against the internal surface 52 of the die cavity 46, the outer surface 56 will have a smooth finish. This enables the bushing 34 to be utilized without extensive machining of the surface 56. Thus, by expanding the blank 44 at a temperature below its crystallization temperature, the outer surface of the bushing 34 is formed to the desired dimensions and finish in a single relatively simple cold working process. Of course, when the present method is utilized to form tubular laminated articles other than bushings, the internal surface 52 of the die cavity 46 will be sized in accordance with the desired external diameter of the tubular laminated article.

Once the blank 44 has been expanded, a second blank 64 (see FIG. 5) is positioned in a central opening 66 formed in the blank 44. The blank 64 is then plastically expanded radially outwardly by the application pressure against an inner surface 70 of the blank 64, in the manner indicated schematically by arrows in FIG. 5. As the blank 64 is expanded by this cold working process, a cylindrical longitudinally extending outer surface 72 of the blank 64 is firmly pressed against the inner surface 60 of the blank 44. This expanding of the blank 64 is continued until the blank 64 has an internal diameter corresponding to the desired diameter of the passage 38 through the bushing 34. Since the blank 64 is expanded by a cold working process, that is the blank is expanded at a temperature below the crystallization temperature of the metal of the blank, the inner surface 70 of the blank will have a smooth finish.

The blank 64 is pressed against the blank 44 with sufficient pressure to firmly interconnect or join the two blanks so that friction between the outer surface 72 of the blank 64 and the inner surface 60 of the blank 44 retains the blanks against axial movement relative to each other. This results in the formation of a unitary bushing 34 of a laminated construction. The blank 44 forms an outer layer of the laminated bushing 34 (see FIG. 3) while the inner blank 64 forms the inner layer of the laminated bushing. The inner surface 70 of the blank 64 has been accurately and smoothly formed to cooperate with the pin 32 in the desired manner. Similarly, the outer surface 56 of the blank 44 has been accurately and smoothly formed to provide the desired interference fit with the leading end portions 26 of the links 24 (see FIG. 2). Of course, the internal and external diameters of a tubular laminated article constructed by the present method can be varied in accordance with the environment in which the article is to be used.

Although the bushing 34 has been shown as having a continuous cylindrical outer surface, it should be understood that a slot or keyway could be provided in the bushing by merely providing a suitable protuberance in the die cavity 46. Similarly, the bushing 34 could be provided with flat locating surfaces which would cooperate with similar surfaces on the links 24. It should be understood that the bushing 34 could, if desired, have a configuration other than the illustrated cylindrical configuration.

During operation of the tractor 10 (see FIG. 1), the inner surface of the bushing 34 will tend to be worn as the pin 32 and bushing 34 rotate relative to each other. To enhance the service life of the bushing 34, the inner surface is advantageously formed of an extremely hard material which is wear resistant. The outer surface of the bushing 34 is subjected to impact or shock loads by the drive sprocket 16, engagement of the track shoes 18 with external objects, and other causes during operation of the tractor 10. To enable the bushing 34 to withstand these severe impact or shock loads, the outer surface of the bushing 34 is advantageously made of a relatively ductile material which will not crack or break when it is subjected to shock loads.

In accordance with a feature of the present invention the laminated bushing 34 has a hard inner layer which will resist wear upon relative movement between the bushing and the associated one of the pins 32. The outer layer of the bushing 34 is formed of a relatively soft ductile material which will not break or shatter when subjected to impact or shock loading. Thus, the laminated bushing 34 is particularly well adapted for use in the crawler track assembly 12 wherein the hard inner layer and relatively ductile outer layer will enhance the service lift of the bushing. However, it should be understood that bushings constructed in accordance with the present invention and having layers of different hardness can be utilized in environments other than crawler track assemblies.

The laminated bushing 34 is made by expanding the tubular blanks 44 and 64. If the tubular blank 64 was extremely hard and brittle at the time that it was to be expanded, it would be extremely difficult or impossible to expand the blank without breaking or cracking it. Therefore, the tubular blank 64 is relatively ductile when it is expanded. However, the tubular blank 64 has a composition such that is is very susceptible to hardening. On the other hand, the tubular blank 44 is relatively ductile and has a comparatively low susceptibility to hardening.

Once both of the tubular blanks 44 and 64 have been expanded to form a unitary laminated bushing 34, only the inner blank 64 will be substantially effected by subjecting the bushing 34 to a hardening process. Since the inner layer of the laminated bushing 34 has a much higher susceptibility to hardening, the hardening process will result in the hardenss of the inner layer of the bushing being greatly increased. However, the outer layer of the bushing 34 is relatively insusceptible to hardening and will remain ductile after the bushing is subjected to a hardening process.

While the blanks 44 and 64 can be made of many different types of metals having different susceptibilities to hardening, in one specific embodiment of the invention the blank 44 was formed of 1010 steel and the inner blank 64 was formed of 1035 steel. The relatively high carbon content of the inner blank 64 enables the blank to be hardened by heating and quenching the bushing 34. The relatively low carbon content of the blank 44 resulted in a very small change in the hardness of the outer layer of the bushing. Thus, by expanding the steel blanks 44 and 64 when they are relatively ductile and workable, a laminated bushing 34 having layers of different hardenabilities is formed. After the bushing 34 has been removed from the die cavity 46, it is subjected to a heat treatment to harden the inner layer 64 of the bushing in a known manner.

The illustrated bushing 34 has a relatively hard inner layer and a ductile outer layer. This construction of the bushing 34 makes it particularly well suited for use in crawler track assemblies, such as the crawler track assembly 12. However, it is contemplated that laminated bushings and other tubular articles constructed in accordance with the present invention will be utilized in environments other than the crawler track assembly 12. Depending upon the environment in which the bushing or other article is used, it may be desirable to have the bushing formed with the inner layer of a relatively ductile material and the outer layer of a relatively hard wear resistant material. If the bushing is to be used in such an environment, the first blank expanded in the die cavity 46 will have a high hardenability while the second or inner blank will have a relatively low hardenability. Therefore, subsequent heat treatment of the bushing results in the formation of a very hard outer layer and a relatively ductile inner layer. While steels of different carbon content can be utilized to form the layers of different hardnesses, it should be understood that other materials could be utilized to form one or more of the layers.

It is contemplated that in certain environments it will be desirable to have bushings or other tubular articles which have a very hard inner layer and a very hard outer layer with a ductile core between the two layers. This laminated bushing or article construction would render the inner and outer surfaces of the bushing extremely wear resistant while the ductile core of the bushing would enhance the ability of the bushing to withstand shock or impact loading. The positioning of tubular blanks 80, 82 and 84 in a die or work cavity 86 to form such a bushing is illustrated in FIG. 7. The cylindrical outer blank 80 and the cylindrical inner blank 84 are formed of metals having a relatively high susceptibility to hardening. On the other hand, the cylindrical center or core blank 82 has a relatively low susceptibility to hardening.

The blank 80 is plastically expanded into engagement with a wall 90 of the die or work cavity 86 to form the blank with the desired external diameter. The blanks 82 and 84, which are located within the blank 80, are also plastically expanded to press the blanks firmly against each other to form a unitary bushing assembly by pressure-friction engagement between the cylindrical surfaces of the blanks. The resulting three layered laminated bushing is then removed from the die cavity and heat treated to harden the external and internal layers formed by the coaxial blanks 80 and 84. The blanks 80 and 84 may advantageously be formed of a relatively high carbon content steel, while the blank 82 is formed of a low carbon content steel. However, it is contemplated that in certain environments it may be desirable for the inner layer 84 to be formed of bronze or other bearing materials.

The blanks 44 and 64 were sequentially expanded in the work cavity 46 (see FIGS. 4 and 5) by applying pressure to the internal surface 60 of the blank 44 to expand this blank. Once the blank 44 has been expanded, the blank 64 is inserted into the blank 44 and expanded outwardly to bring its outer surface into firm abutting engagement with the inner surface 60 of the blank 44.

The blanks 44 and 64 could have been expanded at the same time. This method is illustrated in FIG. 7 wherein the blanks 80, 82 and 84 have all been positioned in a co-axial relationship in the work cavity 86. Pressure is then applied against an internal surface 94 of the blank 84 to expand the blank 84 outwardly into engagement with the internal surface of the blank 82. The pressure against the internal surface 94 of the blank 84 is continued to expand the blank 82 outwardly into engagement with the internal surface of the blank 80. Continued application of the relatively high pressure against the internal surface 94 of the blank 84 results in all of the blanks 80, 82 and 84 being expanded outwardly so that an external surface 96 of the blank 80 is pressed against the internal surface 90 of the work cavity 86 with sufficient force to form the blank 80 to the desired external diameter. The foregoing expansion of the blanks 80, 82 and 84 is a cold working process in that it takes place at a temperature which is below the crystallization temperature of the metal of the blanks.

From the foregoing it can be seen that the tubular blanks for forming a laminated bushing can be expanded either sequentially, in the manner illustrated in FIGS. 4 through 6, or contemporaneously, in the manner described in connection with FIG. 7. Of course, a combination of these methods could be utilized if desired. Thus, two of the blanks, for example, the blanks 80 and 82 could be expanded at one time. After expansion of the blanks 80 and 82, the blank 84 could be inserted into the blanks 80 and 82 and then expanded to firmly grip the blank 82 which forms the next adjacent layer of the laminated bushing.

Once a laminated bushing or other article has been formed, it is important that the layers of the bushing or other article do not move axially relative to each other. It has been found that pressure engagement between the external surface of one blank and the internal surface of the next adjacent outer blank results in a firm joining or uniting of the two blanks. The joining or uniting provided by the pressure engagement between the blanks is, for most purposes, sufficient to prevent the blanks from moving axially relative to each other. However, in certain environments, it may be necessary to mechanically interlock the blanks to prevent axial movement between the blanks. This can be accomplished by forming an indentation or recess in the external blank and expanding the internal blank outwardly into this recess. This results in the formation of a protuberance on the inner blank which extends into the indentation on the outer blank to thereby form a mechanical interconnection between the two blanks. However, it should be understood that for most purposes the pressure engagement between the surfaces of the blanks is sufficient to prevent the blanks from moving axially relative to each other.

Although the method of the present invention can advantageously be used to form laminated bushings, tubular laminated articles for use in other environments can advantageously be made by this method. Of course, the particular combination of relatively ductile and relatively hard layers utilized in the laminated article will vary depending upon the environment in which it is to be used. However, regardless of whether the layers are formed of a ductile material or a relatively hard material, strong laminated articles are advantageously formed to accurate internal and external dimensions by plastically expanding tubular metal blanks at a temperature below the crystallization temperature of the blanks so that the blanks are cold worked to provide a tubular laminated article having smooth internal and external surfaces which are accurately formed to the desired dimensions without machining. Tubular articles have heretofore been made from seamless tubing. However, since commercial seamless tubing commonly has a wall thickness variation of between 6 per cent and 12 per cent, the seamless tubing must be machined on both the inside and the outside to provide surfaces which are accurately dimensioned. In addition, tubular articles having walls which are not laminated have poorer strength characteristics than do tubular articles having walls of the same thickness but formed by a plurality of laminations.

The superior strength characteristics of a laminated tubular article constructed in the manner illustrated schematically in association with FIGS. 4–7 enable it to be advantageously used as a pressure tube 110 (FIG. 8) in an impact absorber assembly 112 on a vehicle to absorb impact forces generated as a result of the vehicle encountering an accident. Although the impact absorber assembly 112 can be associated with other parts of the vehicle, it is shown in connection with te bumper 114 and frame members 116 and 118 of the vehicle. When the vehicle encounters a collision or other accident, the impact absorber assembly 112 pressurizes a suitable material 120 within the pressure tube 110 to at least partially absorb impact forces to protect occupants of the vehicle.

Accordingly, upon the occurrence of an accident, the bumper 114 is pressed toward the frame members 116 and 118 so that the pressure tube 110 slides into a guide cylinder 124. As the telescopic relationship between the pressure tube 110 and guide tube 124 increases, a piston 128 which is connected with the frame member 118 by a piston rod 130, pressurizes the material 120 in a chamber 134 formed at the outer end of the pressure tube 110. The material 120 is advantageously a compressible natural or synthetic organic elastomeric material, for example a polysiloxane elastomer having a molecular weight of 500,000 or above, or a natural or synthetic rubber such as GRS rubber, Neoprene, or a natural gum rubber could be used. However, it is contemplated that a gas or a metered hydraulic fluid could be pressurized in the chamber 134 in a known manner to provide the requisite force absorbing capability.

The pressure tube 110 must be capable of withstanding relatively large forces resulting from the pressurization of the material 120. These relatively large forces will tend to cause the pressure tube 110 to bulge outwardly and burst. Of course, premature bursting of the pressure tube 110 would impair the impact absorbing capabilities of the assembly 112 and the protection to the occupants of the vehicle. Also, the pressure tube 110 must be able to withstand pressure forces resulting from minor impacts against the bumper 114 without bursting. If the pressure tube 110 burst each time the bumper 114 was banged or lightly impacted, the impact absorber assembly 112 would be rendered inoperative until the pressure tube was replaced.

In addition to being able to withstand relatively high internal pressure forces resulting from the pressurization of the material 120, the pressure tube 110 must have an accurately dimensioned internal surface 138 which is disposed in tight sliding engagement with an external surface 140 of the piston 128. If there was excessive clearance between the external surface 140 to the piston 128 and the internal surface 138 of the pressure tube 110, the material 120 could escape between the piston and pressure tube without providing the desired impact absorbing characteristics. If the fit between the external surface 140 of the piston 128 and the internal surface 138 of the pressure tube 110 is too tight, relative movement will not occur in the desired manner between the pressure tube and piston upon the occurrence of an accident.

The cylindrical external surface 144 of the pressure tube 110 must also be accurately dimensioned so as to provide tight sliding engagement with an internal surface 146 of the guide cylinder 124. If the clearance between the external surface 144 of the pressure tube 110 and guide surface 146 is too great, the pressure tube 110 will be unable to withstand sidewise loading of the bumper 114 without cocking or binding within the guide cylinder 124.

From the foregoing, it is apparent that the pressure tube 110 must be capable of withstanding relatively large internal pressure forces resulting from the pressurization of the material 120 and relatively large bending forces which result from sidewise loading of the bumper 114. In addition, the pressure tube 110 must have an accurately formed internal surface 138 to provide for the desired cooperation between the pressure tube and the piston 140. The external surface 144 of the pressure tube 110 must also be accurately formed to provide the desired cooperation between the pressure tube 110 and the guide cylinder 124. To obtain the requisite strength and dimensional characteristics at a relatively low cost, the pressure tube 110 is advantageously made by plastically expanding tubular metal blanks in a work cavity at a temperature below the crystallization temperature of the metal in a manner illustrated schematically in FIGS. 4–7 and described in connection with the tubular laminated bushing 34.

In accordance with the present invention, the pressure tube 110 has a laminated construction with a cylindrical outer layer 150 and a cylindrical inner layer 152. An outer surface 154 of the inner layer 152 is disposed in tight abutting engagement with an inner surface 156 of the outer layer 150 to fixedly connect the inner and outer layers and form a unitary pressure tube 110. The inner surface 138 of the inner layer 152 is accurately dimensioned to cooperate with the surface 140 of the piston 128. Similarly, the outer surface 144 of the outer layer 150 is accurately dimensioned to cooperate with the inner surface 146 of the guide tube 124. In addition, a reinforcing layer 158 is provided on the outside of the pressure tube 110 along the side of the pressure chamber 134. Of course, the reinforcing layer 158 could be omitted if desired.

To form the laminated pressure tube 110 in accordance with the present invention, a first tubular blank, similar to the blank 80 of FIG. 7, is inserted into a stepped die or work cavity, similar to the work cavity 86. This tubular blank has a length corresponding to the axial extent of the reinforcing layer 158. The tubular blank is then plastically expanded by applying radially outwardly directed pressure against an inner surface of the blank at a temperature below the crystallization of the metal of the blank. This pressure is continued for a sufficient length of time to press the outer surface of the blank tightly against the inner surface of the die cavity to cold work the blank to the desired external diameter.

Once the first or outer blank has been expanded to form the reinforcing layer 158 of the pressure tube 110, a second blank, similar to the blank 64 of FIG. 5, is positioned in a central opening in the outer blank. The second blank is then plastically expanded radially outwardly at a temperature below its crystallization temperature to press the surface 144 of this blank firmly against both the internal surface of the reinforcing layer and the internal surface of the stepped die cavity. Finally, the inner blank, similar to the blank 94 of FIG. 7, is inserted into the blank 150 and is expanded outwardly at a temperature below its crystallization temperature to form the inner layer 152. This expanding of the inner blank is continued until the internal surface 138 of the blank is cold worked to provide a smooth surface having an internal diameter corresponding to the desired internal diameter of the pressure tube 110.

Of course, the pressure tube 110 can be formed of metal layers having different hardness characteristics in the same manner as previously explained in connection with the bushing 34. Thus, a blank having a relatively low carbon content can be expanded to form the outer layer 150 of the pressure tube 110 while blanks having a relatively high carbon content could be expanded to form the reinforcing layer 158 and inner layer 152 of the pressure tube 110. Once the three blanks have been expanded while they were both in a relatively ductile condition, the blanks would be subjected to a hardening process which would result in a hardening of the reinforcing and inner layers while the outer layer 150 remained relatively ductile. Of course, all of the layers 150, 152, and 158 could be formed of a metal having a relatively high carbon content so they would all be susceptible to a hardening process. The particular combination of metals utilized to form the layers 150, 152, and 158 of the pressure tube 110 would depend upon the operating characteristics which the pressure tube must have and will vary with many different factors including the mass of the vehicle with which the pressure tube 110 is associated and the energy absorbing characteristics which are to be provided by the impact absorber assembly 112. Of course, the pressure tube 110 could be formed of more or less than three layers of metal of either the same or different hardenability characteristics in order to provide the pressure tube 110 with the desired operating characteristics. In addition, it is contemplated that these blanks could be expanded one at a time or contemporaneously.

From the foregoing description, it can be seen that a laminated bushing, pressure tube, or other article can be inexpensively constructed by the method of the present invention to have superior strength and dimensional characteristics. The laminated bushing 34 has a hard inner layer which resists wear upon relative movement between the laminated bushing 34 and an associated pin 32. The relatively ductile outer layer of the laminated bushing 34 enables the bushing to withstand shock or impact loads during operation of the vehicle 10. However, it should be understood that a laminated bushing constructed in accordance with the present invention could have various arrangements of hard and ductile layers and could be utilized in environments other than the crawler track assembly 12.

The pressure tube 110 has a laminated construction so that it has sufficient strength to withstand the application of relatively large pressure forces against the interior of the pressure tube. In addition, the pressure tube 110 has sufficient strength to withstand sidewise loadings which are commonly applied against the bumper 114 in other than collision conditions. Since the pressure tube 110 is accurately formed with smooth internal and external surfaces without machining, the cost of fabricating the pressure tube tends to be minimized.

The laminated bushing 34 and pressure tube 110 are made by expanding blanks, one or more at a time, in a work cavity at a temperature below the crystallization temperature of the metal forming the blanks. As the outermost blank is expanded its outer surface is moved into engagement with the inner surface of a die or work cavity to form the blank to a desired size and shape. Inner blanks are expanded outwardly to securely grip each other and the outer blank to form a unitary laminated article having a plurality of layers.

It is contemplated that it may be desirable for the pressure tube, or other laminated article to have relatively hard layers which are wear resistant and at least one relatively ductile layer which is capable of withstanding severe shock loadings. This is achieved by utilizing blanks having different hardenability characteristics to form the laminated bushing. Once the blanks have been expanded, the layers having a relatively high hardenability are hardened while the layers having a relatively low hardenability maintain their ductility. Of course, tubular laminated articles other than the bushing 34 and pressure tube 110 can advantageously be fabricated by the present method.

Having described specific preferred embodiments of the invention, the following is claimed:

1. A method of making a tubular laminated article having a plurality of layers disposed in tight abutting engagement with each other such that the layers are firmly joined and an outer one of said layers defines an axially extending outer surface of said laminated article and an inner one of said layers defines an axially extending inner surface of said laminated article, said method comprising the steps of providing a die means which at least partially defines a work cavity having an internal surface of a size and shape corresponding to the size and shape of at least a portion of the axially extending outer surface of said laminated tubular article, providing a number of tubular steel blanks having different hardenability characteristics which corresponds to the number of layers in said laminated article, positioning the tubular blanks within the work cavity, plastically expanding the tubular blanks in the work cavity at a temperature below the crystallization temperature of the metal of the tubular blanks by applying outward pressure to inner surfaces of the tubular blanks to press surfaces of the tubular blanks into tight abutting engagement with each other to thereby form and firmly join the plurality of layers of said laminated article, heat treating the layers of said laminated article formed by the tubular steel blanks in such a manner that a layer of said laminated article formed by one of the tubular steel blanks has a hardness which is greater than the hardness of another layer of said laminated article formed by another of the tubular steel blanks, and removing the laminated article from the work cavity, said step of positioning the tubular blanks in the work cavity including the step of positioning in the work cavity a first one of the tubular blanks having an axially extending outer surface of a cross-sectional size which is smaller than the cross-sectional size of the axially extending outer surface of said laminated article, said step of plastically expanding the tubular blanks at a temperature below the crystallization temperature of the metal of the tubular blanks including the step of applying pressure against the inner surface of said first tubular blank to plastically expand said first tubular blank until the axially extending outer surface of said first tubular blank is pressing firmly against the internal surface of the work cavity and has a size corresponding to the size of the axially extending outer surface of said laminated article, said step of positioning tubular blanks in the work cavity further including the step of positioning within said first tubular blank after said first tubular blank has been expanded, a second tubular blank having an axially extending outer surface of a cross-sectional size which is smaller than the cross-sectional size of the inner surface of said first tubular blank and an axially extending inner surface, said step of plastically expanding tubular blanks further including the step of applying pressure against the inner surface of said second tubular blank after having performed said step of expanding said first tubular blank to plastically expand said second tubular blank until the axially extending outer surface of said second tubular blank is pressing firmly against an axially extending inner surface of said first tubular blank.

2. A method as set forth in claim 1 wherein said method step of heat treating the layers of said laminated article formed by the tubular steel blanks is performed after completion of said step of plastically expanding all of the tubular blanks at a temperature below the crystallization temperature of the metal of the tubular blanks.

3. A method as set forth in claim 1 wherein said step of providing a plurality of tubular steel blanks having different hardenability characteristics includes the method step of providing one steel blank having a first carbon content and providing another steel blank having a second carbon content which is greater than said first carbon content.

* * * * *